United States Patent Office.

CONSTANTIN KRAUSS AND RUDOLPH MÜLLER VON BERNECK, OF HÖCHST-ON-THE-MAIN, GERMANY, ASSIGNORS TO FARBWERKE, VORMALS MEISTER, LUCIUS & BRÜNING, OF HÖCHST-ON-THE-MAIN, GERMANY, A CORPORATION OF GERMANY.

METHOD OF REGENERATING PLATINUM CONTACT SUBSTANCES.

SPECIFICATION forming part of Letters Patent No. 720,361, dated February 10, 1903.

Application filed March 6, 1902. Serial No. 96,922. (No specimens.)

*To all whom it may concern:*

Be it known that we, CONSTANTIN KRAUSS, Ph.D., and RUDOLPH MÜLLER VON BERNECK, chemist, citizens of the Empire of Germany, residing at Höchst-on-the-Main, Germany, have invented certain new and useful Improvements in the Method of Restoring the Activity of Platinum Used in Catalytic Processes, of which the following is a specification.

It is known that arsenic has a most deleterious effect on the activity of finely-divided platinum used as a contact substance in the manufacture of sulfuric anhydrid. In other words, it is one of the most powerful of the so-called "contact poisons." Although pyrites-burner gases may be most carefully purified, yet it happens that traces of arsenic enter the contact-chamber, and thus permanently impair the action of the contact. The arsenic appears to become attached to the platinum, forming fixed compounds with oxygen, which reduce its activity. Hitherto it was necessary to stop working to remove the contact subtance and to regenerate it in the usual manner by dissolving the platinum in aqua regia and then reduce it again on the contact-carrier, (asbestos or the like.) This manipulation involved great loss by stopping the apparatus, besides the disagreeable operation with aqua regia and the cost of chemicals and wages. It has been proposed, for instance, by the Aktien-Gesellschaft für Zinkindustrie, German Patent No. 115,333, to regenerate the contact substance while working by treating it with chlorin, bromin, or iodin and then distilling the impurities as volatile halogen compounds.

Our present invention relates to the combined application of steam and sulfur dioxid for transforming the fixed compounds of arsenic into easily-volatile compounds.

If, for instance, steam is introduced into the purified pyrites-burner gases entering the apparatus containing the hot contact, the activity of the latter decreases, but with the mixture of $SO_2$, $O_2$, $SO_3$, and $H_2SO_4$ leaving the contact all arsenic gradually escapes, as may easily be proved by examining the condensed acid. Introduction of steam into the pyrites-burner gases is continued until no further arsenic can be traced in the products. If dried gases are then introduced, the contact regains its activity. The issuing gases now contain increasing quantities of $SO_3$, and the normal activity of the platinum contact is attained in a short time.

Having now described our invention, what we claim is—

The herein-described process of regenerating the platinum contact substance employed in the manufacture of sulfuric anhydrid, which consists in passing through said platinum contact substance a mixture of steam, purified pyrites-burner gases and oxygen, until the resulting gases contain no arsenic compounds, and then introducing dried purified pyrites-burner gases and oxygen into the contact substance until the same attains its normal activity, substantially as set forth.

In testimony that we claim the foregoing as our invention we have signed our names in presence of two subscribing witnesses.

CONSTANTIN KRAUSS.
RUDOLPH MÜLLER VON BERNECK.

Witnesses:
ALFRED BRISBOIS,
BERNHARD LYDECKER.